United States Patent
Brusniak et al.

(10) Patent No.: US 9,247,364 B2
(45) Date of Patent: Jan. 26, 2016

(54) VARIABLE APERTURE PHASED ARRAY INCORPORATING VEHICLE SWARM

(71) Applicant: The Boeing Company, Chicago, IL (US)

(72) Inventors: Leon Brusniak, Lynnwood, WA (US); James R. Underbrink, Seattle, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 14/057,581

(22) Filed: Oct. 18, 2013

(65) Prior Publication Data

US 2015/0112518 A1    Apr. 23, 2015

(51) Int. Cl.
| | |
|---|---|
| H04R 29/00 | (2006.01) |
| G01H 3/00 | (2006.01) |
| G05D 1/00 | (2006.01) |
| G05D 1/10 | (2006.01) |
| G01M 15/14 | (2006.01) |
| H04R 1/40 | (2006.01) |

(52) U.S. Cl.
CPC ............... *H04R 29/00* (2013.01); *G01H 3/00* (2013.01); *G01M 15/14* (2013.01); *G05D 1/0027* (2013.01); *G05D 1/104* (2013.01); *H04R 1/406* (2013.01)

(58) Field of Classification Search
CPC ........ H04R 1/406; H04R 29/00; G01S 3/808; G01S 5/20; G01S 5/22; G05D 1/0027; G05D 1/104; G01H 3/00; G01M 15/14
USPC .................................................. 701/3; 73/587
See application file for complete search history.

(56) References Cited

U.S. PATENT DOCUMENTS

| | | | | |
|---|---|---|---|---|
| 5,894,450 | A * | 4/1999 | Schmidt et al. | 367/134 |
| 6,288,973 | B1 * | 9/2001 | Joynes | 367/118 |
| 6,760,449 | B1 * | 7/2004 | Matsuo | 381/92 |
| 7,783,385 | B2 * | 8/2010 | Tamura | 700/248 |
| 7,929,376 | B2 | 4/2011 | Underbrink et al. | |
| 8,494,689 | B1 * | 7/2013 | Ashton | 701/3 |
| 8,761,603 | B1 * | 6/2014 | Maleki | 398/129 |
| 2004/0030571 | A1 * | 2/2004 | Solomon | 705/1 |
| 2004/0068416 | A1 * | 4/2004 | Solomon | 705/1 |
| 2005/0271221 | A1 * | 12/2005 | Cerwin | 381/92 |
| 2006/0253570 | A1 * | 11/2006 | Biswas et al. | 709/224 |

(Continued)

FOREIGN PATENT DOCUMENTS

| | | |
|---|---|---|
| EP | 1762357 A1 | 3/2007 |
| EP | 2052846 A1 | 4/2009 |

OTHER PUBLICATIONS

Chung, S. J. et al., "Swarms of Femtosats for Synthetic Aperture Applications", 4th International Conference on Spacecraft Formation Flying Missions and Technologies (SFFMT), St-Hubert, Quebec, May 18-20, 2011, 10 pages.*

(Continued)

*Primary Examiner* — Behrang Badii
*Assistant Examiner* — David Testardi
(74) *Attorney, Agent, or Firm* — Toler Law Group, PC (57) ABSTRACT

In one aspect a system for acoustic testing comprises a plurality of acoustic sensors mounted to a plurality of vehicles, a control system to control the plurality of vehicles, and a data acquisition system to receive data generated by the plurality of acoustic sensors in response to noise from a noise source proximate the plurality of vehicles.

18 Claims, 7 Drawing Sheets

(56) References Cited

U.S. PATENT DOCUMENTS

2009/0268555 A1* 10/2009 Underbrink et al. .......... 367/135
2009/0326870 A1    12/2009 Brusniak
2011/0281602 A1* 11/2011 Azimi-Sadjadi et al. ..... 455/507
2013/0107668 A1*  5/2013 Holyoak et al. .............. 367/118

OTHER PUBLICATIONS

Edwards, Joseph R. et al., "Bistatic synthetic aperture target detection and imaging with an AUV", IEEE Journal of Oceanic Engineering, vol. 26, No. 4, Oct. 2001, pp. 690-699.*

Fonti, A. et al., "Cooperative and decentralized navigation of autonomous underwater gliders using predictive control", Preprints of the 18th IFAC World Congress, Milano (Italy) Aug. 28-Sep. 2, 2011, pp. 12813-12818.*

McCook, Christopher J.R. et al., "Flocking for heterogeneous robot swarms: a military convoy scenario", 39th Southeastern Symposium on System Theory, Mercer University, Macon, GA, 31207, Mar. 4-6, 2007, paper MA1.6.*

Ogren, Petter et al., "Cooperative Control of Mobile Sensor Networks: Adaptive Gradient Climbing in a Distributed Environment", IEEE Transactions on Automatic Control, vol. 49, No. 8, Aug. 2004, pp. 1292-1302.*

Office Action for Canadian Application No. 2,860,217 (File Ref. No. 82301-526) from the Canadian Intellectual Property Office dated Jun. 8, 2015, 4 pages.

* cited by examiner

VARIABLE APERTURE PHASED ARRAY INCORPORATING VEHICLE SWARM

RELATED APPLICATIONS

None

FIELD OF THE DISCLOSURE

The subject matter described herein relates to an apparatus for acquiring acoustic data and more particularly to a method for changing capabilities of an acoustic array.

BACKGROUND

Noise sources may be analyzed to understand the physics behind noise generated by the noise sources. For example, arrays of microphones may be positioned proximate a noise source, such as an aircraft engine, to collect noise data from a noise source. The arrays of microphones are sometimes referred to as acoustic arrays or acoustic phased arrays. The noise data collected by the arrays of microphones may be analyzed using specialized software to determine what components within, and exterior to the engine contribute to the noise. Information extracted from the analysis may be useful in design and/or operation of devices which include noise sources. For example, aircraft manufacturers may use such information in the design of aircraft components which generate noise.

Accordingly, apparatus and methods for changing the capabilities of an acoustic array may find utility.

SUMMARY

In one aspect, a system for acoustic testing comprises a plurality of acoustic sensors mounted to a plurality of vehicles, a control system to control the plurality of vehicles, and a data acquisition system to receive data generated by the plurality of acoustic sensors in response to noise from a noise source proximate the plurality of vehicles.

In another aspect, a method for acoustic testing comprising positioning a plurality of vehicles proximate a noise source, wherein the plurality of vehicles comprise a plurality of acoustic sensors mounted to a plurality of vehicles, controlling the plurality of vehicles to move into a first predetermined configuration in a first predetermined location in which the acoustic sensors form a first acoustic array having a first aperture size and a first spatial resolution, and receiving data generated by the plurality of acoustic sensors in response to noise from a noise source proximate the plurality of vehicles.

In another aspect, a method for acoustic testing comprises positioning a plurality of unmanned air vehicles proximate an engine, wherein the plurality of unmanned air vehicles comprise a plurality of acoustic sensors mounted to a plurality of vehicles, controlling the plurality of unmanned air vehicles to move into a first predetermined configuration in a first predetermined location in which the acoustic sensors form a first acoustic array having a first aperture size and a first spatial resolution, and receiving data generated by the plurality of acoustic sensors in response to noise from the engine.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Phased array measurement capabilities are determined by both the overall size of the array (i.e., the aperture size) and by how the sensors are distributed spatially (i.e., the spatial resolution). For sensors that are fixed in space, the array measurement capabilities are likewise fixed and cannot be changed. By allowing the sensors to move to any of an infinite number of locations in space, the array measurement capabilities therefore likewise become infinite. The subject matter described herein allows for a mobile acoustic sensor that could be deployed in any scenario for which the location and/or magnitude of a noise source is desired. Such capabilities could be implemented together into a single type (i.e., operate on ground, underwater or in air), or operate in a combination of mediums (ground only; water only; air only; ground and water; ground and air; water and air). The sensors of the array could even be attached to the side of a moving vehicle such as a train, car, airplane, or boat and could have the ability to move around on the side of the object to redistribute as needed.

Figure 1:
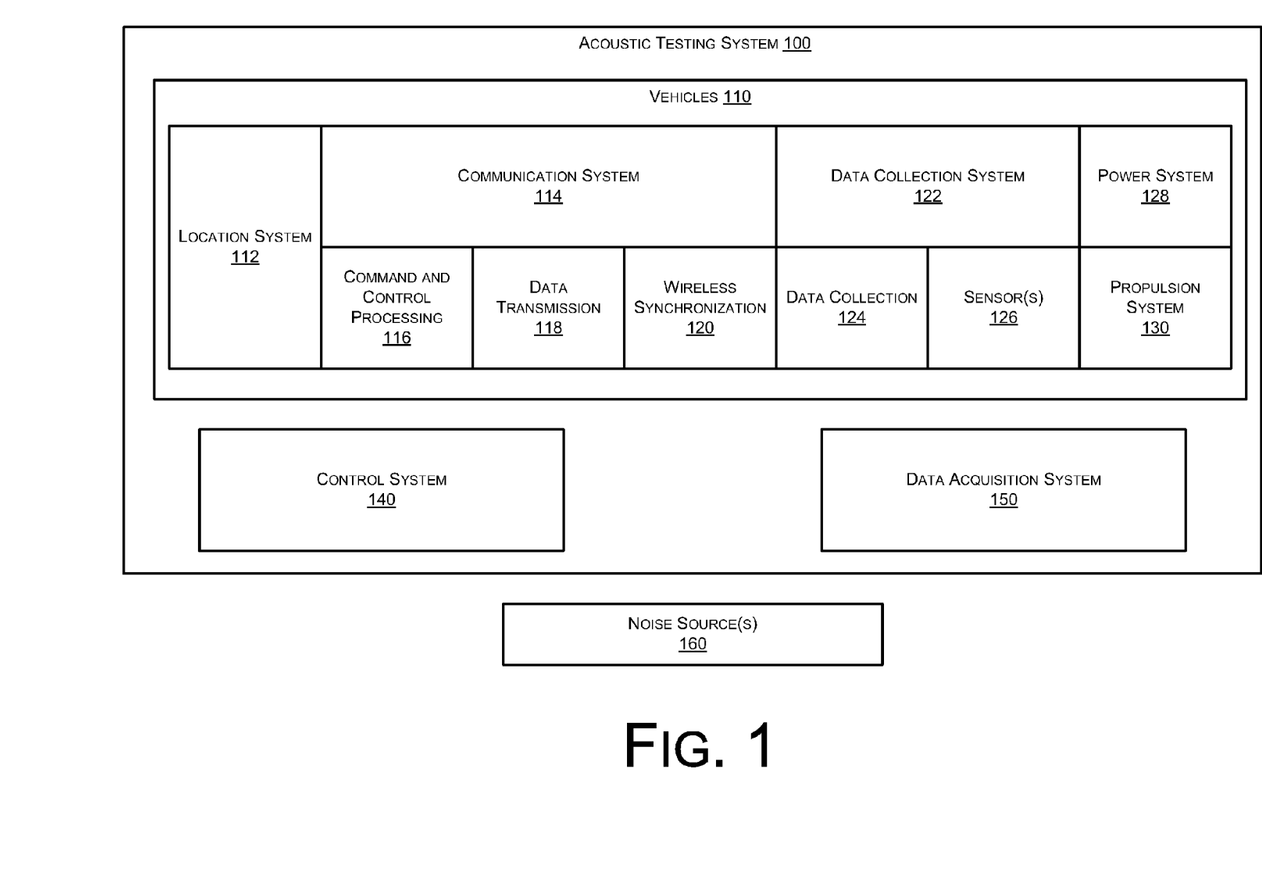
FIG. 1 is a schematic block diagram illustration of a system for acoustic testing according to aspects.

FIG. 1 is a schematic block diagram illustration of a system 100 for acoustic testing according to aspects. Referring to FIG. 1, the system 100 comprises one or more vehicles which include a location system 112, a communication system 114, a data collection system 122, a power system 128 and propulsion system 130.

The location system 112 may comprise a satellite-based navigation system such as a global positioning system (GPS) system or the like. Alternatively, or in addition, the location system 112 may comprise an inertial positioning system, an optical positioning system or the like.

Communication system 114 may be a wireless communication system which operates in accordance with any number of wireless communication standards. Examples of suitable wireless communication interfaces include an IEEE 802.11a, b, or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Communication system 114 may comprise a command and control processing module 116 to process commands and controls received over communication system 114, a data transmission module 118 to transmit data over communication system 114, and a wireless synchronization module 120 to synchronize wireless communication with other devices.

Data collection system 122 comprises a data collection module 124 and one or more sensors 126. Data collection module 124 may be embodied as logic to manage the operations of sensors 126. Examples of suitable sensors 126 may include microphones, hydrophones, laser sensors, seismometers, and other suitable sensors.

Power system 128 provides power to the vehicles 110 and/or to the various systems on vehicles 110. In some examples power systems 128 may include one or more power sources such as a battery or a liquid or solid fuel source. Propulsion system 130 may comprise one or more engines or motors coupled to power system 128 and may comprise a transmission to power wheels, rotors or the like.

In various examples the vehicles 110 may comprise at least one of a manned vehicle, an unmanned aerial vehicle (UAV), an unmanned ground-based vehicle or an unmanned underwater-based vehicle. For example, the vehicles 110 may comprise UAVs such as quadrotor crafts, helicopters, blimps, or the like. Ground-based vehicles 110 may include remote-control (RC) vehicles 110 which move on wheels, tracks, or the like. Underwater-based vehicles 110 may include submersible vehicles which move using propellers or other appropriate underwater propulsion systems.

Acoustic testing system 100 further comprises a control system 140 to control operations of vehicles 110 and a data acquisition system 150 to receive data from the data collection system 122 on vehicles 110. Control system 140 and data acquisition system 150 may be implemented on computer systems and may be communicatively coupled to the vehicles 110 via communication system 114.

In operation, the acoustic testing system 100 may be used to detect and characterize noise from a noise source 160. Examples of noise sources may include mechanical systems such as aircraft engines, industrial machinery, aircraft frames and/or control surfaces, underwater biologics and the like.

In some embodiments the acoustic testing system 100 may comprise a plurality of vehicles 110 which may be controlled by control system 140 to behave in a coordinated fashion. Such a group of vehicles 110 may be referred to as a "swarm" of vehicles 110. In operation, the control system 140 may instruct the plurality of vehicles 110 to form particular configurations in particular locations proximate the noise source 160 to collect data from the noise source 160. The particular configurations and locations may be changed during an acoustic test.

Figure 2:
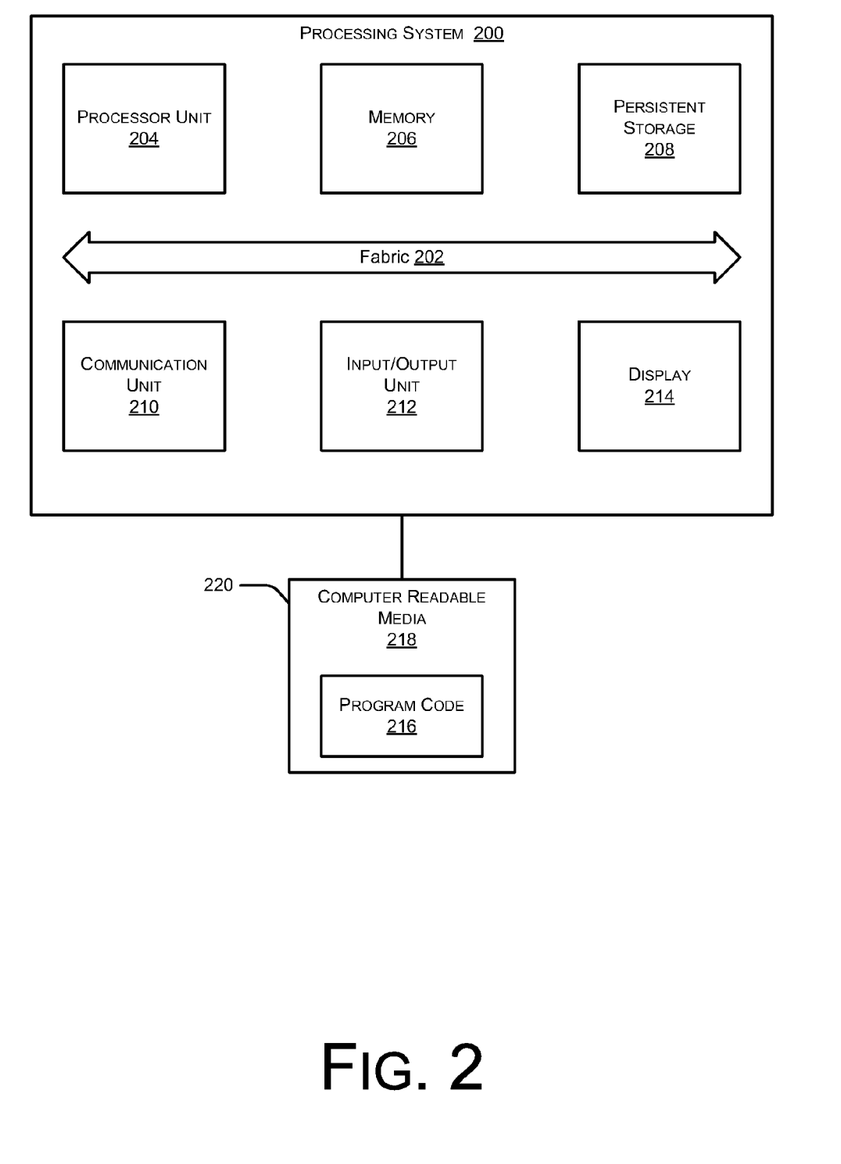
FIG. 2 is a schematic block diagram of a processing system which may be used in a system for acoustic testing, according to aspects.

FIG. 2 is a schematic block diagram of a processing system 200 which may be used in a system for acoustic testing, according to aspects. In the example depicted in FIG. 2, processing system 200 includes a communication fabric 202, which provides a communication path between processor unit 204, memory 206, persistent storage 208, communications unit 210, input/output (I/O) unit 212, and display 214.

Data processing system 200 is an example of a data processing system that may be used to implement control system 140 and/or data acquisition system 150 depicted in FIG. 1. If used to implement data acquisition system 150 in FIG. 1, input/output unit 212 may be connected to communication system 114 on vehicles 110.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 may be located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

Having described structural features of a system 100 for acoustic testing, attention will now be turned to operations implemented in an example acoustic test environment. FIGS. 3A-3D are schematic illustrations of an environment 300 for acoustic testing according to aspects, and FIG. 4 is a flowchart illustrating operations in a method for acoustic testing according to aspects. Similar test environments are described in commonly assigned U.S. Pat. No. 7,929,376 to Underbrink, et al., entitled METHOD AND APPARATUS FOR IDENTIFYING NOISE SOURCES, the disclosure of which is incorporated herein by reference in its entirety.

Figure 3A:
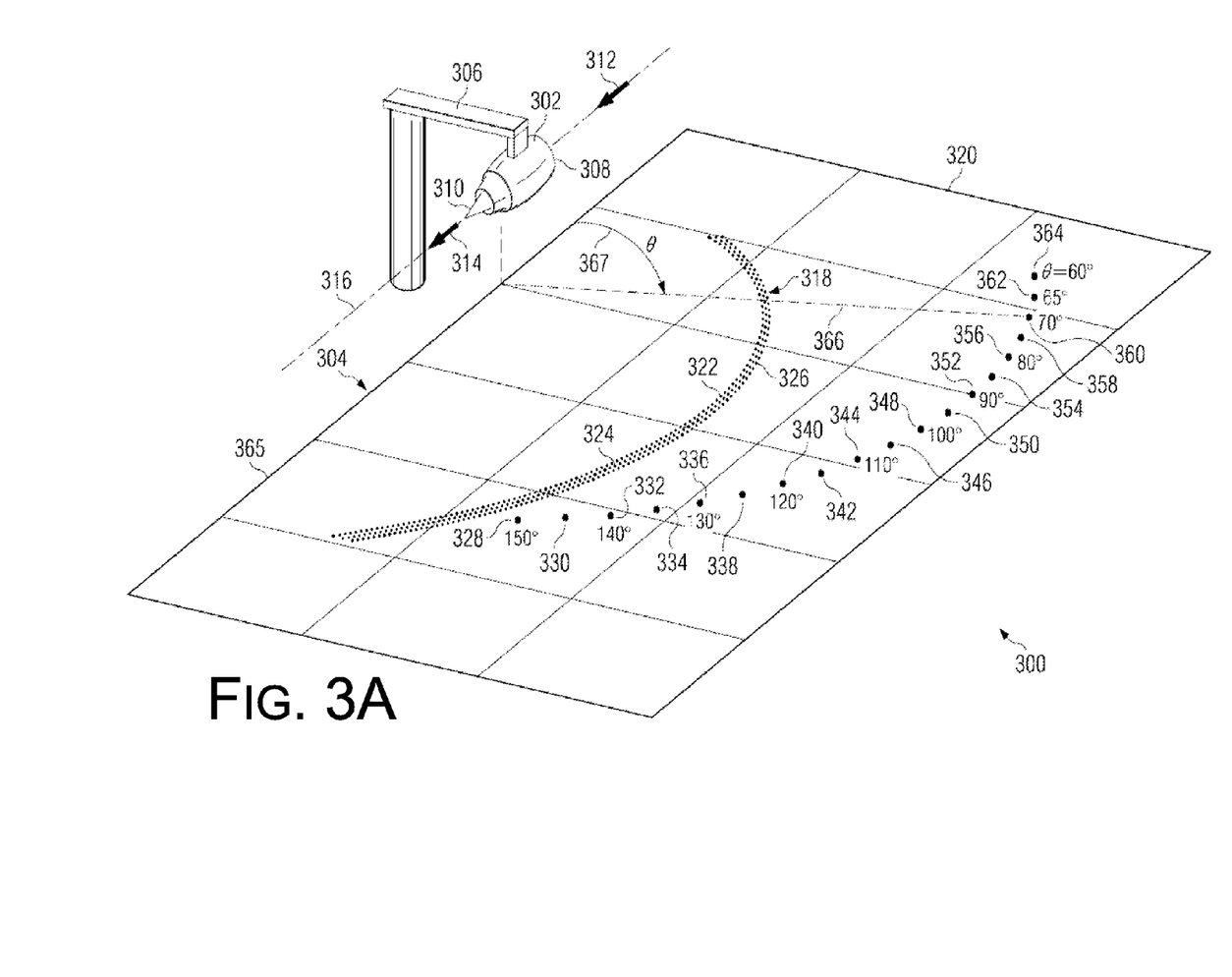
FIGS. 3A-3D are schematic illustrations of an environment for acoustic testing according to aspects.
Figure 3B:
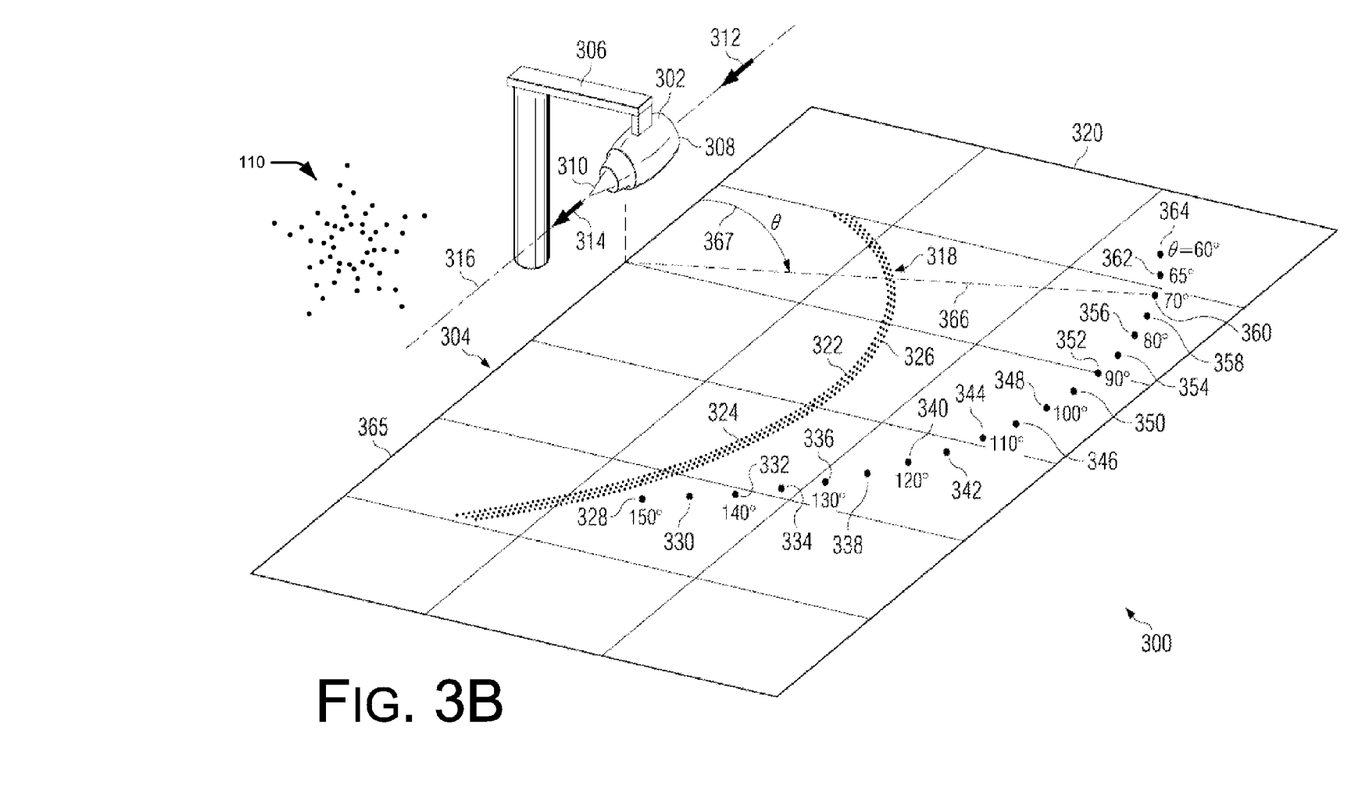
Figure 3C:
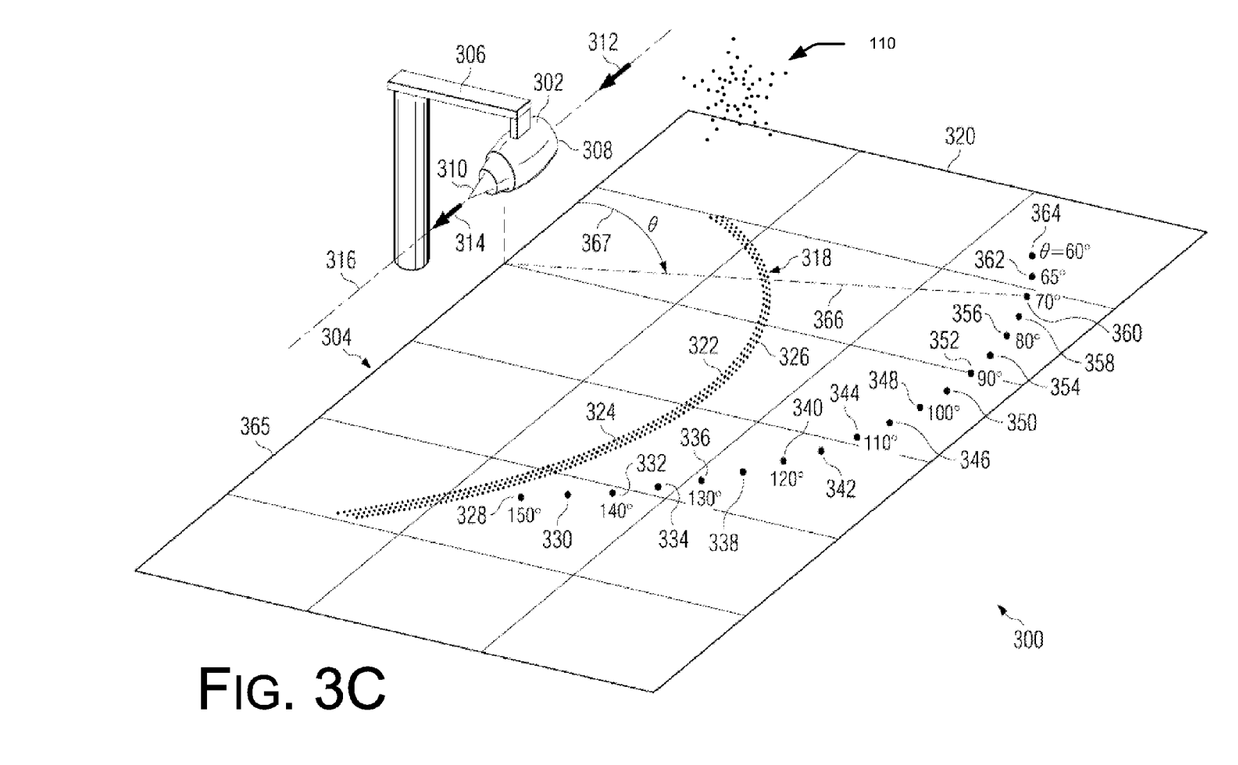
Figure 3D:
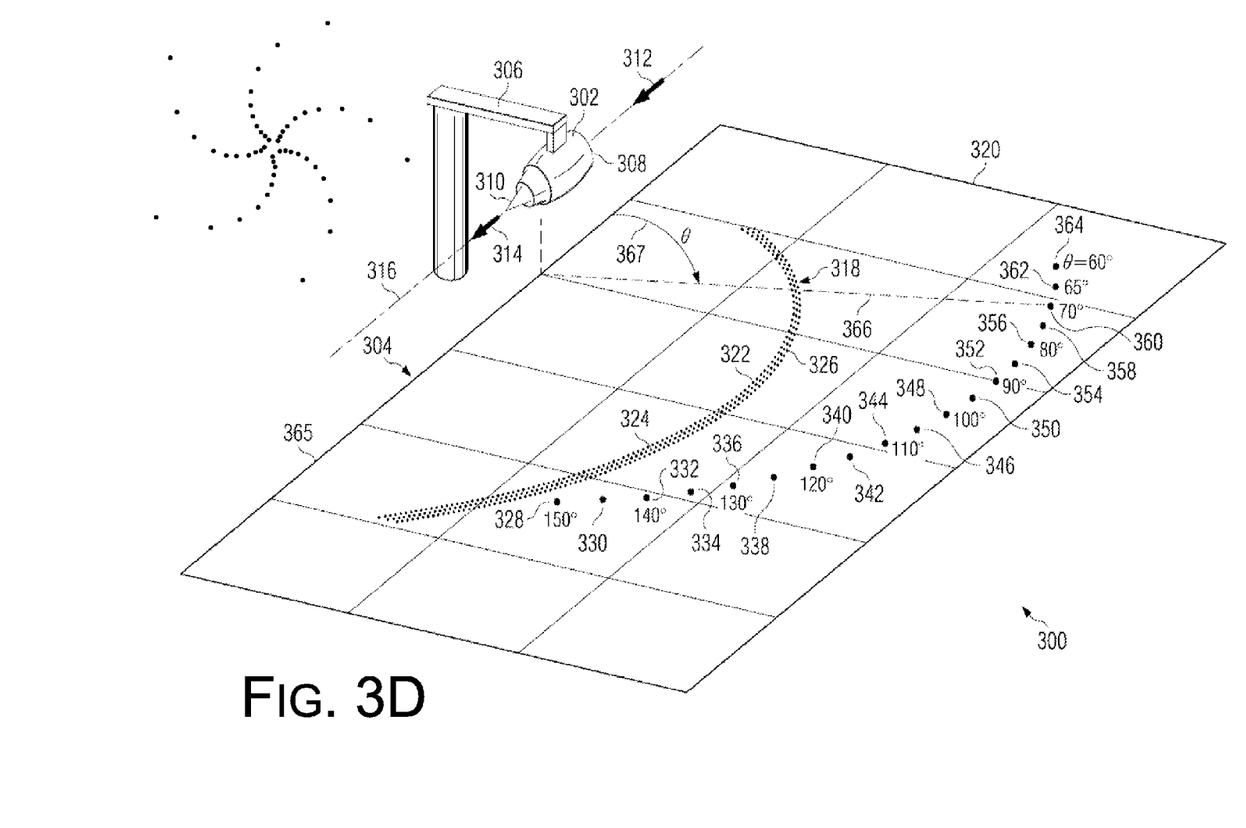
Figure 4:
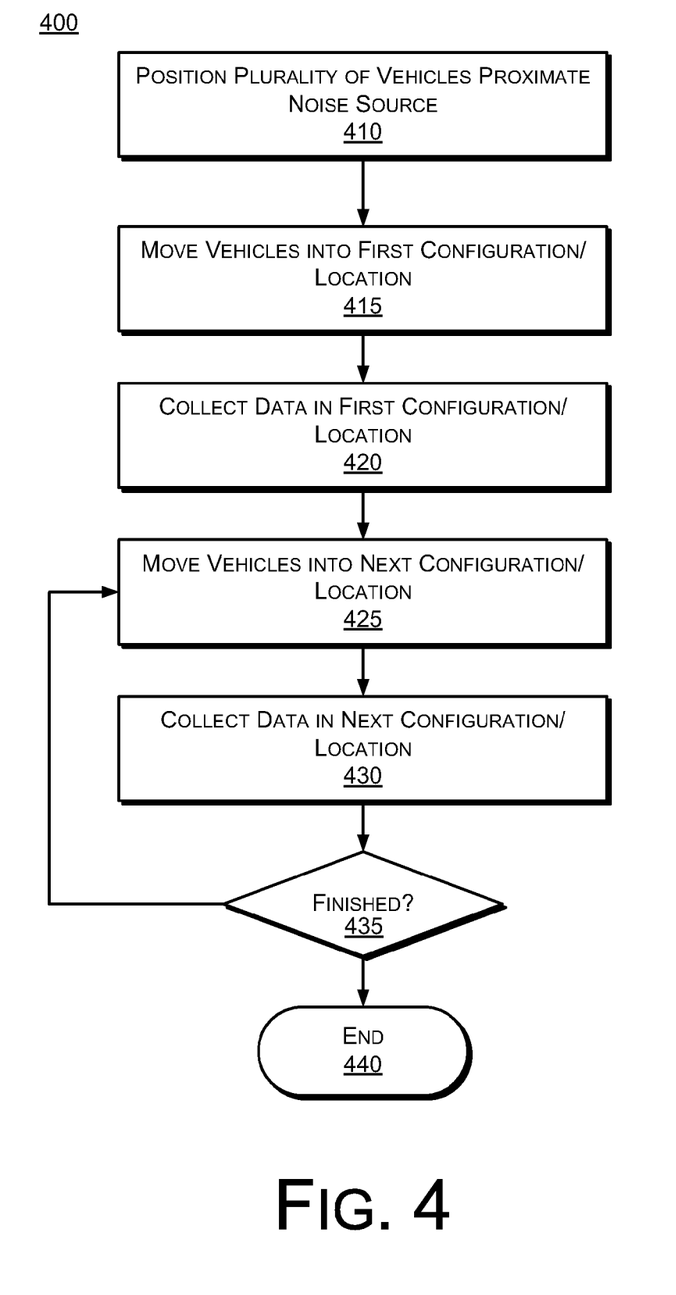
FIG. 4 is a flowchart illustrating operations in a method for acoustic testing according to aspects.

Referring first to FIG. 3A, in one example a noise collection environment 300 may include a jet engine 302 mounted above ground 304 on stand 306. Jet engine 302 is a device under test and is an example of a noise source, such as noise source 160 in FIG. 1, that may be analyzed using noise collection environment 300.

Jet engine 302 has inlet 308 and exhaust nozzle 310. Inlet 308 receives air flow into jet engine 302 as illustrated by arrow 312. Exhaust flow leaves jet engine 302 through exhaust nozzle 310 as shown by arrow 314. Noise generated by jet engine 302 may radiate from various points of jet engine axis 316, as well as from other points that may be selected.

The collection of noise data may be made through noise collection environment 300, which includes phased array microphones 318. The microphones 318 may be arranged into an array having a predetermined pattern on a ground plane 320 located on ground 304.

Noise collection environment 300 also includes far field microphones 328, 330, 332, 334, 336, 338, 340, 342, 344, 346, 348, 350, 352, 354, 356, 358, 360, 362, and 364. These microphones may be located at measurement points of interest. In the example depicted in FIG. 3A, nineteen fixed locations are present. These microphones may be located on and/or above ground plane 320. These microphones may be mounted on structures to locate the microphones above ground plane 320.

In these examples, array 318 may be selected or configured to have a relatively consistent density of sensors over all, while having non-redundant sensor-to-sensor spacing locally. Array 318 has approximately or around the same number of elements in different locations of the array to provide a relatively consistent density overall. If array 318 has a relatively consistent density, then extracting a subarray of a given aperture size anywhere along array 318 results in a subarray with approximately the same number of sensors. Non-redundant sensor spacing means that the vector spacing between any two elements in the subarray will be unique. Vector spacing is the distance and direction. A non-redundant array has no two vector spacings that are the same.

In this example, phased array microphones 318 contain 416 elements at fixed locations. The different microphones within phased array microphones 318 may be located at a spacing of around six inches from each other. Further, phased array microphones 318 may span over 200 feet to cover the range of required emission angles at the minimum required distance from jet engine 302.

Array 318 has a pattern in the form of an arc, in these examples. In particular, phased array microphones 318 are arranged in the arc containing three curves, curve 322, curve 324, and curve 326.

The half-wavelength criteria for array design to prevent spatial aliasing (i.e., false images) when using equally spaced sensors limits the usefulness of an equally spaced array to about 1000 Hz when six inch spacing is used. In other words, the spacing between adjacent sound sensors in the array must be less than or equal to the half wavelength criteria for equally spaced sound sensors to avoid false images when performing noise source location operations.

The different advantageous embodiments recognize that currently an array may be designed for frequencies exceeding this half-wavelength criteria by using a design approach that insures non-redundant spacing between microphone pairs. Such an array may eliminate false images and suppress array side lobes to the point where the array is useful over a broad range of frequencies. The advantageous embodiments also recognize that an array can be formed using a strategy, such as geometrically increased spacing between successive microphones.

However, the different advantageous embodiments recognize that these arrays are "point design" arrays. For example, these arrays are designed as a single array for a single position. The different advantageous embodiments recognize that multiple instances of these point design arrays may be deployed to cover multiple emission angles.

The different advantageous embodiments also recognize that a traversable array also will not solve the problem, again, because the need for a large number of array locations would be prohibitive from a test conduct standpoint, for example, the time to acquire data for the number of traverse positions required may be prohibitive.

Thus, the different advantageous embodiments recognize that what is needed is an array that is globally made up of a relatively consistent density of microphones. The relatively consistent density across the array enables selection of similarly performing subarrays at any point within the array. The locally non-redundant characteristic enables these subarrays to perform well across a broad range of frequencies, including frequencies that substantially exceed the half-wavelength criteria for equally spaced array elements. The array design, in the different advantageous embodiments, embraces and achieves these principles.

Phased array microphones 318 may be distributed as a set of concentric logarithmic spirals. As used in these examples, concentric logarithmic spirals have a common point of origin from which the spirals are formed. These spirals start with different initial radii such that when the spirals are formed, nearly parallel curves are present. A logarithmic or equiangular spiral is a well known mathematical construct.

In one embodiment, phased array microphones 318 include three logarithmic spiral arcs with a common origin and a small increase in initial radius for each successive spiral, thus forming three parallel curves. Parameters may be chosen for the logarithmic spirals to ensure that every point on the curve is at least 10 mixed nozzle diameters from every point in the candidate source region. Mixed nozzle diameter is also referred to as Dmix. Dmix is the effective diameter of the exhaust flow from the jet engine.

In this example, 10 mixed nozzle diameters is considered to be far enough away from the source region that noise source components detected by the phased array microphones 318 can be used to accurately estimate the strength of those sources at distances farther away from the sources than the phased array microphones 318. The logarithmic spiral parameters include, for example, origin location, spiral angle, and initial radius. The logarithmic spirals are sampled to determine sensor locations, each using different base spacings between successive sensors.

In the illustrative examples, the curve with the smallest radius uses a base spacing of 26.8", the curve with the next larger radius uses a base spacing of 22.8", and the curve with the largest radius uses a base spacing of 17.8". Within each log spiral curve, the actual spacing may be varied from the base spacing according to the sequence {−1.5", −1.0", −0.5", 0.0", 0.5", 1.0", 1.5"}, and the sequence is repeated until the entire spiral has been sampled.

The base spacing may be chosen to distribute the available number of sensors over the full length of the three curves. A different base spacing is used for each curve such that when the base spacing with variation is applied to each curve, no spacing is repeated until the variation sequence is recycled for a given curve. This strategy creates a locally non-redundant array while preserving a relatively constant density of sensors along the full length of the array. The spatially separated curves, along with the log spiral arc, contribute to additional non-redundancy both locally and globally.

The array of sensors in phased array microphones 318 also may be more generally a set of concentric curves for which a shape of the set of curves is selected by a minimum distance of the array of sensors to the candidate source region and wherein a nearest curve in the set of curves is located at the minimum distance. As used in these examples, the minimum distance may vary in different implementations.

In these examples with jet engine 302, the minimum spacing is around 10 mixed nozzle diameters. The set of all of the candidate source location points comprises the candidate source region. In other words, a user may define the source region and specify a minimum distance. These parameters may be used to form a boundary around the source region such that no point outside the boundary is less than the minimum distance from any point in the source region.

In the different examples, the microphones in phased array microphones 318 may have a shape of a continuous curve for which a tangent to the continuous curve is kept substantially close to perpendicular to lines of sight to the candidate noise source locations to be assessed using the sensor array. Also, the phased array microphones 318 may be located substantially perpendicular to lines of sight from the potential noise source region of interest to the measurement points of interest.

The above example array design is not intended to restrict the array design parameters that may be implemented in the different advantageous embodiments. The array may be composed from a single curve or multiple curves. Various other strategies could be used within each curve. The one feature, in these different designs, is globally consistent array density, with locally non-redundant sensor spacing. The location of the array relative to the device under test is application dependent, but the array design principles still apply.

Increased density of microphones will typically improve subarray performance since, for a non-redundant array, the number of sensors in an array for a given aperture size generally improves sensor array performance both in terms of array dynamic range and maximum frequency at which the array provides useful information.

Thus, the design strategy provides an approach for making optimal use of a restricted number of sound sensors for broad coverage of emission angles and frequency range.

In the different advantageous embodiments, the different far field microphones 328-364 are arranged in locations with respect to jet engine axis 316. These different locations have different angles. Line 365 is directly below and parallel to jet engine axis 316 on ground plane 320. The angles for far field microphones 328-364 may be determined from line 365 on the ground, as shown by line 366 and angle 367, which is also referred to as θ.

For example, far field microphone 328 is located at 150 degrees relative to jet engine axis 316. Far field microphone 340 is located at 120 degrees relative to jet engine axis 316. As another example, far field microphone 362 is located at 65 degrees.

In the different advantageous embodiments, noise generated by jet engine 302 may be detected by phased array microphones 318 and far field microphones 328-364. These different microphones transduce noise into noise data which may be analyzed to identify different noise source component locations due to operation of jet engine 302. In these examples, the analysis may be made for candidate noise source locations and for different measurement points of interest. In these examples, the candidate noise source locations may lie along jet engine axis 316 and the measurement points of interest may correspond to the locations of the far field microphones 328-364.

A similar setup may be made for other devices or noise sources. For example, for a highway with traffic, a laterally distributed region of potential noise sources is present. For the highway, various characteristics such as, for example, overpasses, intersections, and differing road surfaces, and other suitable features may be present. The measurement points of interest may be locations such as, for example, residences, city parks, businesses, and other suitable locations.

Microphones are present at the measurement points of interest to measure the overall noise at those locations. An array may be deployed between the candidate source region, the highway, and the points of interest to determine component breakdown of sources contributing to the overall noise at the points of interest.

In some embodiments the acoustic test system 100 may be introduced into the test environment 300 to control a plurality of vehicles 110, each of which may comprise one or more sensors 126. Referring to FIG. 4, at operation 410 a plurality of vehicles 110 are positioned proximate a noise source, e.g., jet engine 302. At operation 415, the plurality of vehicles 110 are moved into a first configuration in a first location. By way of example, referring to FIG. 3B, in some embodiments control system 140 may control the plurality of vehicles 110 to move into a first predetermined configuration in a first predetermined location in which the acoustic sensors 126 form a first acoustic array having a first aperture size and a first spatial resolution. In the first predetermined configuration the plurality of sensors may be positioned in a first plane which may be different than the ground plane 320.

At operation 420 the sensors 126 on the plurality of vehicles 110 collect noise data from the jet engine 302. The noise data may be stored locally by the data collection system 122 and/or forwarded to the data acquisition system 150 via the communication system 114.

At operation 425 the plurality of vehicles 110 are moved into a different configuration and/or location. By way of example, referring to FIG. 3C, the control system 140 may control the plurality of vehicles 110 to move from the first predetermined configuration into a second predetermined configuration in which the acoustic sensors 126 form a second acoustic array having a second aperture size and a second spatial resolution.

In some examples the control system 140 controls the plurality of vehicles 110 to move to a predetermined location in response to a signal, e.g., a signal from the control system 140, or in response to an environmental condition such as rain, wind, a light condition, or the like. In some examples, the second predetermined configuration positions the plurality of sensors 126 in a plurality of planes such that the aperture is three-dimensional.

At operation 430 the sensors 126 on the plurality of vehicles 110 collect noise data from the jet engine 302 in the second configuration and/or location. The noise data may be stored locally by the data collection system 122 and/or forwarded to the data acquisition system 150 via the communication system 114.

If, at operation 435 the acoustic test is not finished then control may pass back to operation 425 and the controller again moves the plurality of vehicles 110 into a different configuration and/or location. By way of example, referring to FIG. 3D, the control system 140 may control the plurality of vehicles 110 to move from the second predetermined configuration into a third predetermined configuration in which the acoustic sensors 126 form a third acoustic array having a third aperture size and a second spatial resolution and the data collection process continues.

By contrast, if at operation 435 the acoustic test is finished then control passes to operation 440 and the test is finished. Thus, the operations depicted in FIG. 4 allow the controller 140 to position the plurality of vehicles 110 in a variety of different positions and locations during an acoustic test. Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system for acoustic testing, comprising:
   a plurality of acoustic sensors mounted to a plurality of vehicles, wherein the plurality of vehicles comprise at least one aerial-based vehicle;
   a control system configured to:
      instruct the plurality of vehicles to move into a first predetermined configuration at a first time; and
      instruct the plurality of vehicles to move into a second predetermined configuration at a second time; and
   a data acquisition system configured to:
      receive a first set of data generated by the plurality of acoustic sensors in response to noise from a noise source proximate the plurality of vehicles when the plurality of vehicles are in the first predetermined configuration at the first time; and
      receive a second set of data generated by the plurality of acoustic sensors in response to noise from the noise source proximate the plurality of vehicles when the plurality of vehicles are in the second predetermined configuration at the second time.

2. The system of claim 1, wherein the plurality of vehicles comprises at least one of a maimed vehicle, an unmanned aerial vehicle, an unmanned water-based vehicle, or an unmanned ground-based vehicle.

3. The system of claim 1, wherein the plurality of acoustic sensors, when the plurality of vehicles are in the first predetermined configuration, form a first acoustic array having a first aperture size and a first spatial resolution.

4. The system of claim 3, wherein the first predetermined configuration positions the plurality of acoustic sensors in a first plane.

5. The system of claim 3, wherein the plurality of acoustic sensors, when the plurality of vehicles are in the second predetermined configuration, form a second acoustic array having a second aperture size and a second spatial resolution.

6. The system of claim 5, wherein the second predetermined configuration positions the plurality of acoustic sensors in a plurality of planes.

7. The system of claim 1, wherein the control system instructs the plurality of vehicles into move to the first predetermined configuration in response to a first signal.

8. The system of claim 1, wherein the control system instructs the plurality of vehicles to move into the first predetermined configuration in response to an environmental condition or a test condition.

9. The system of claim 1, wherein the control system is communicatively coupled to the plurality of vehicles via a wireless communication interface.

10. The system of claim 1, wherein the control system is configured to determine, based on the first set of data and the second set of data, different locations corresponding to respective noise source components included in the noise source.

11. The system of claim 1, further comprising determining, based on the first set of data and the second set of data, different locations corresponding to respective noise source components included in the noise source.

12. A method for acoustic testing, comprising:
   instructing a plurality of vehicles to move into a first predetermined configuration at a first time, wherein a plurality of acoustic sensors are mounted to the plurality of vehicles, and the plurality of vehicles comprise at least one aerial-based vehicle;
   receiving a first set of data generated by the plurality of acoustic sensors in response to noise from a noise source proximate the plurality of vehicles in the first predetermined configuration at the first time;
   instructing the plurality of vehicles to move into a second predetermined configuration at a second time; and
   receiving a second set of data generated by the plurality of acoustic sensors in response to noise from a noise source proximate the plurality of vehicles in the second predetermined configuration at the second time.

13. The method of claim 12, wherein the plurality of vehicles comprises at least one of a manned vehicle, an unmanned aerial vehicle, an unmanned water-based vehicle, or an unmanned ground-based vehicle.

14. The method of claim 13, further comprising moving the plurality of vehicles into the first predetermined configuration in response to an environmental condition.

15. The method of claim 12, wherein the first predetermined configuration positions the plurality of sensors in a first plane.

16. The method of claim 12, wherein the plurality of acoustic sensors, when the plurality of vehicles from are in the first predetermined configuration, form a first acoustic array having a first aperture size and a first spatial resolution, and wherein the plurality of acoustic sensors, when the plurality of vehicles are in the second predetermined configuration, form a second acoustic array having a second aperture size and a second spatial resolution.

17. The method of claim 12, wherein the second predetermined configuration positions the plurality of sensors in a plurality of planes.

18. The method of claim 12, further comprising moving the plurality of vehicles into the first predetermined configuration in response to a signal.

* * * * *